United States Patent
Liu

(10) Patent No.: US 12,151,510 B2
(45) Date of Patent: Nov. 26, 2024

(54) QUICK-RELEASE STRUCTURE

(71) Applicant: FUL CHEE ENT CO., LTD., Taichung (TW)

(72) Inventor: Yu-Chen Liu, Taichung (TW)

(73) Assignee: FUL CHEE ENT CO., LTD., Taichung (TW)

(*) Notice: Subject to any disclaimer, the term of this patent is extended or adjusted under 35 U.S.C. 154(b) by 563 days.

(21) Appl. No.: 17/495,819

(22) Filed: Oct. 7, 2021

(65) Prior Publication Data
US 2023/0025681 A1 Jan. 26, 2023

(30) Foreign Application Priority Data
Jul. 21, 2021 (TW) .................................. 110126733

(51) Int. Cl.
*B60B 27/02* (2006.01)
*B62K 25/02* (2006.01)

(52) U.S. Cl.
CPC ............ *B60B 27/026* (2013.01); *B62K 25/02* (2013.01); *B62K 2206/00* (2013.01)

(58) Field of Classification Search
CPC .... B60B 27/026; B62K 25/02; B62K 2206/00
See application file for complete search history.

(56) References Cited

U.S. PATENT DOCUMENTS

| | | | | |
|---|---|---|---|---|
| 7,735,937 B2* | 6/2010 | Chonan | ................. | B62K 25/02 |
| | | | | 301/124.2 |
| 8,042,881 B2* | 10/2011 | Inoue | .................... | B62K 25/02 |
| | | | | 301/124.2 |
| 8,783,790 B2* | 7/2014 | Achenbach | ........... | B62K 25/02 |
| | | | | 301/124.2 |
| 8,820,126 B2* | 9/2014 | Lin | ........................ | B62H 5/001 |
| | | | | 70/232 |
| 10,173,747 B2* | 1/2019 | Kuerner | ................. | B62K 25/02 |
| 10,703,134 B2* | 7/2020 | Lai | ......................... | B62K 25/02 |
| 10,780,736 B2* | 9/2020 | Madhaven | ............ | B62K 25/10 |
| 11,458,765 B2* | 10/2022 | Spahr | ..................... | B62K 25/02 |
| 2008/0087058 A1* | 4/2008 | Chang | ..................... | E05B 71/00 |
| | | | | 411/432 |

* cited by examiner

*Primary Examiner* — Jason R Bellinger
(74) *Attorney, Agent, or Firm* — Ying-Ting Chen

(57) ABSTRACT

A quick-release structure includes a fork, a clamping unit, and a quick-release unit. The fork has a receiving space. The clamping unit includes a base, a plurality of arc-shaped clamping members, an elastic ring, and a shaft cover. The base is fixed in the receiving space. The base has a circular cavity. The circular cavity is provided with a plurality of elongated grooves. The arc-shaped clamping members each have a first axle to slide in a corresponding one of the elongated grooves and a second axle. A center of the arc-shaped clamping members is formed with an adjustable clamping opening. The shaft cover is formed with a plurality of axle grooves arranged annularly. The second axles of the arc-shaped clamping members are pivotally connected to the respective axle grooves. The quick-release unit has a shaft. After the shaft passes through the adjustable clamping opening, the adjustable clamping opening subjected to the elastic force of the elastic ring is retracted to clamp the shaft.

10 Claims, 6 Drawing Sheets

QUICK-RELEASE STRUCTURE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a quick-release structure, and more particularly to a quick-release structure including a fork having a clamping unit and a quick-release unit. The clamping unit has an adjustable clamping opening like a camera shutter. A shaft of the quick-release unit has a neck section and an enlarged end. The adjustable clamping opening can be elastically expanded for the enlarged end to pass through the adjustable clamping opening. After the enlarged end passes through the adjustable clamping opening, the adjustable clamping opening is elastically retracted to clamp the neck portion, so as to assemble the quick-release unit quickly.

Description of Related Arts

A conventional bicycle quick release member and wheel assembly structure, as shown in FIG. 1 and FIG. 2, comprises a bicycle fork 10 and a quick-release wheel unit 11 inserted through two ends of the fork 10. One end of the fork 10 has an inner threaded hole 101. The quick-release wheel unit 11 includes a wheel hub 12 and a quick-release member 13. The quick-release member 13 has a shaft 14. One end of the shaft 14 is integrally formed with an external thread 15, and the other end is provided with a locking assembly 16. The locking assembly 16 has a tightening block 17, a drive shaft 18, and a locking handle 19. The external thread 15 is screwed into the inner threaded hole 101 of the fork 10. The locking handle 19 is turned with the drive shaft 18 as the axis. An eccentric portion 191 of the locking handle 19 presses the tightening block 17 against the outside of the fork 10, so that the quick-release assembly 13 can tighten the fork 10 to fix the wheel hub 12. In the above structure, when the external thread 15 of the shaft 14 is screwed into the inner threaded hole 101 of the fork 10, the external thread 15 is gradually screwed into the inner threaded hole 101 by turning the locking handle 19 and the shaft 14. In this way, it is labor-consuming and time-consuming to rotate the quick-release assembly 13 for screwing. It is very inconvenient to use. There is a need for improvement.

SUMMARY OF THE PRESENT INVENTION

The primary object of the present invention is to provide a quick-release structure. A fork is provided with a clamping unit. The clamping unit has an adjustable clamping opening to be retracted and expanded. A shaft of the quick-release unit has a neck section and an enlarged end. The adjustable clamping opening can be elastically expanded for the enlarged end to pass through the adjustable clamping opening. After the enlarged end passes through the adjustable clamping opening, the adjustable clamping opening is elastically retracted to clamp the neck portion, so as to assemble the quick-release unit quickly.

In order to achieve the foregoing object, a quick-release structure is provided. The quick-release structure comprises a fork, a clamping unit, and a quick-release unit. An outer side of one end of the fork has a receiving space. A horizontal circular through hole is defined in the receiving space. The clamping unit includes a base, a plurality of arc-shaped clamping members, an elastic ring, and a shaft cover. The base is fixed in the receiving space. An outer side of the base has a circular cavity. A circular perforation corresponding in position to the circular through hole is defined in a center of the circular cavity. The circular cavity is provided with a plurality of elongated grooves arranged radially at equal intervals around the circular perforation. The arc-shaped clamping members are arranged equidistantly in the circular cavity. The arc-shaped clamping members each have a first axle to slide in a corresponding one of the elongated grooves. The arc-shaped clamping members each have a second axle extending in a direction opposite to the first axle. The elastic ring is buckled on an outer periphery of each arc-shaped clamping member. A center of the arc-shaped clamping members arranged in a ring is formed with an adjustable clamping opening. An inner side of the shaft cover is formed with a plurality of axle grooves arranged annularly. The second axles of the arc-shaped clamping members are pivotally connected to the respective axle grooves. The shaft cover is rotably connected to the base. When the shaft cover is rotated, the arc-shaped clamping members are synchronously driven, and the arc-shaped clamping members each have the second axle as its axis for the first axle to slide toward an outer end of the corresponding elongated groove, and the arc-shaped clamping members counteract an elastic force of the elastic ring to expand the adjustable clamping opening. The quick-release unit has a shaft. One end of the shaft is sequentially formed with a neck section and an enlarged end. The enlarged end has a diameter greater than that of the adjustable clamping opening in a retracted state. Another end of the shaft is provided with a locking member. The shaft of the quick-release unit is inserted through two ends of the fork. The enlarged end of the shaft is inserted in the circular perforation from an inner side of the fork to counteract the elastic force of the elastic ring, so that the first axles of the arc-shaped clamping members slide toward the outer ends of the respective elongated grooves and the arc-shaped clamping members each having the second axle as its axis are expanded outwardly for the enlarged end to pass through the adjustable clamping opening. After the enlarged end passes through the adjustable clamping opening, the adjustable clamping opening subjected to the elastic force of the elastic ring is retracted to clamp the neck section, and the shaft is tightened by the locking member.

In an embodiment of the present invention, the arc-shaped clamping members each have a first arc-shaped clamping portion and a second arc-shaped clamping portion. The first arc-shaped clamping portion and the second arc-shaped clamping portion are arranged in a staggered manner, not coplanar. The second arc-shaped clamping portion of a front one of arc-shaped clamping members overlaps the first arc-shaped clamping portion of a rear one of the arc arc-shaped clamping members. The first arc-shaped clamping portion has the first axle. The second arc-shaped clamping portion has the second axle.

In an embodiment of the present invention, an outer wall of the first arc-shaped clamping portion is concavely formed with a curved surface. The elastic ring is buckled on the curved surface.

In an embodiment of the present invention, an inner side of the base has an extension section. The circular perforation passes through the extension section. The extension section is inserted in the circular through hole.

In an embodiment of the present invention, the circular through hole is provided with an internal thread, and the extension section is provided with an external thread. The extension section of the base is screwed into the circular through hole so that the base is assembled and fixed in the receiving space.

In an embodiment of the present invention, a lug is provided on a periphery of the base. The lug is located in the receiving space. A screw is locked to the lug from the inner side of the fork so that the base is assembled and fixed in the receiving space.

In an embodiment of the present invention, the fork is provided with a screw hole corresponding to an outer wall of the base. A screw is inserted through the screw hole to tighten the outer wall of the base so that the base is assembled and fixed in the receiving space.

In an embodiment of the present invention, a front end of the enlarged end has a tapered portion.

In an embodiment of the present invention, the base has an outer annular rib on an outer periphery of the circular cavity, and a cover rib is provided on an inner periphery of the shaft cover. The cover rib is forced to pass through the outer annular rib so that the shaft cover is rotably pivoted to the base.

In an embodiment of the present invention, a chamfer is formed on an inner edge of one side where the first axle is located of the first arc-shaped clamping portion.

With the above structure, the essential effect of rapid assembly is achieved.

DETAILED DESCRIPTION OF THE PREFERRED EMBODIMENT

Figure 1:
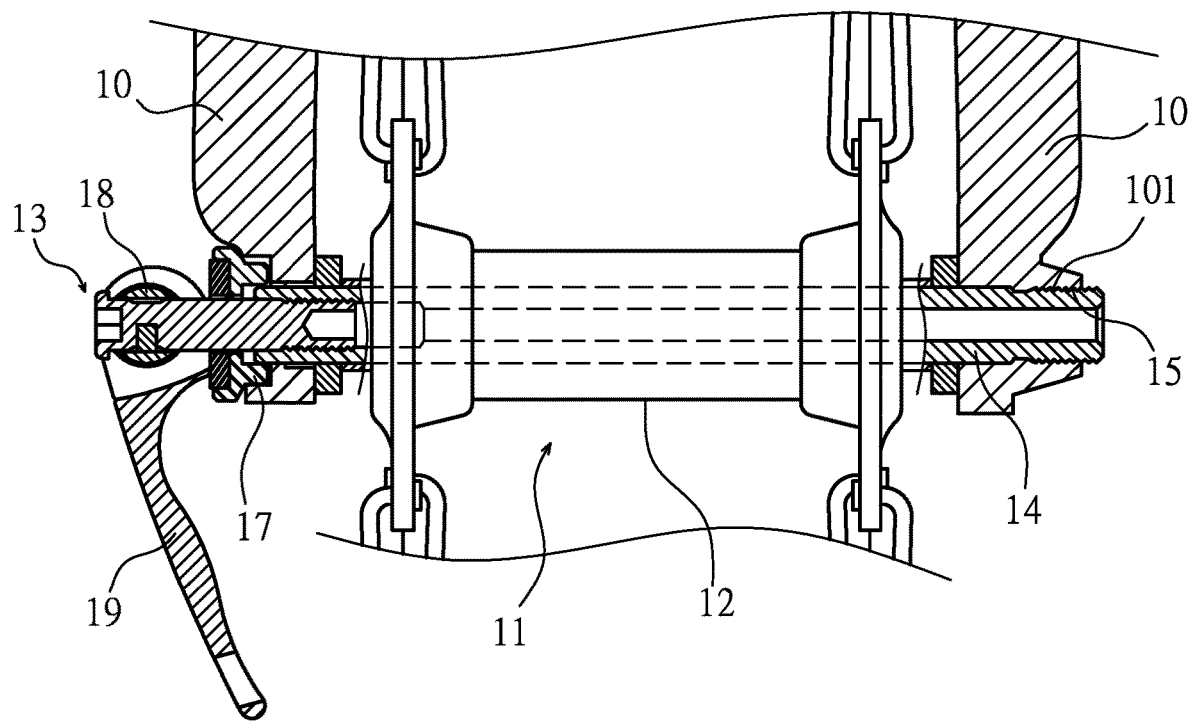
FIG. 1 is a cross-sectional view of a conventional quick-release unit mounted to a wheel.
Figure 2:
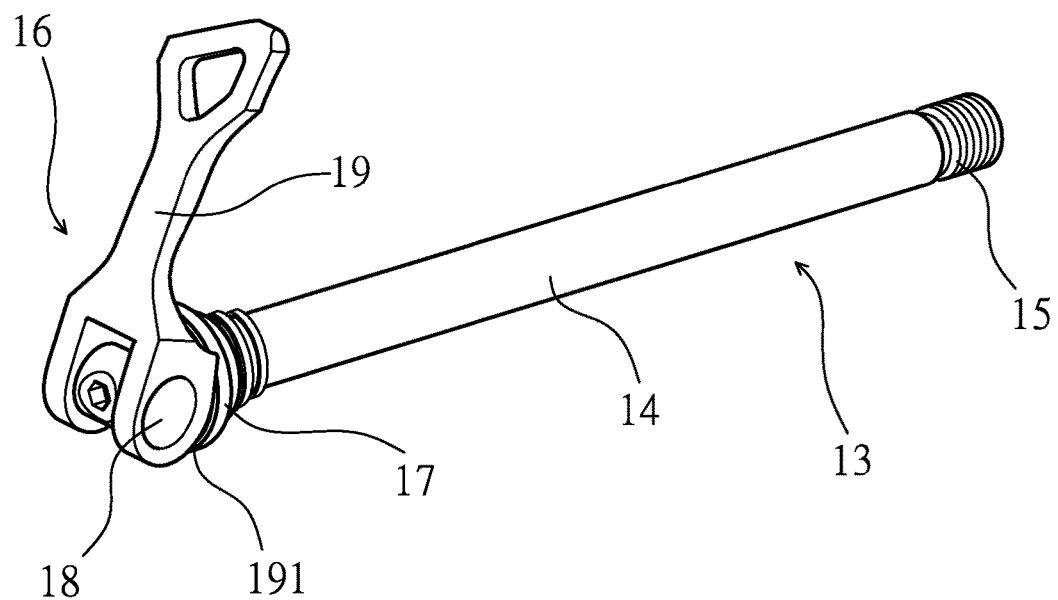
FIG. 2 is a perspective view of the conventional quick-release unit.
Figure 3:
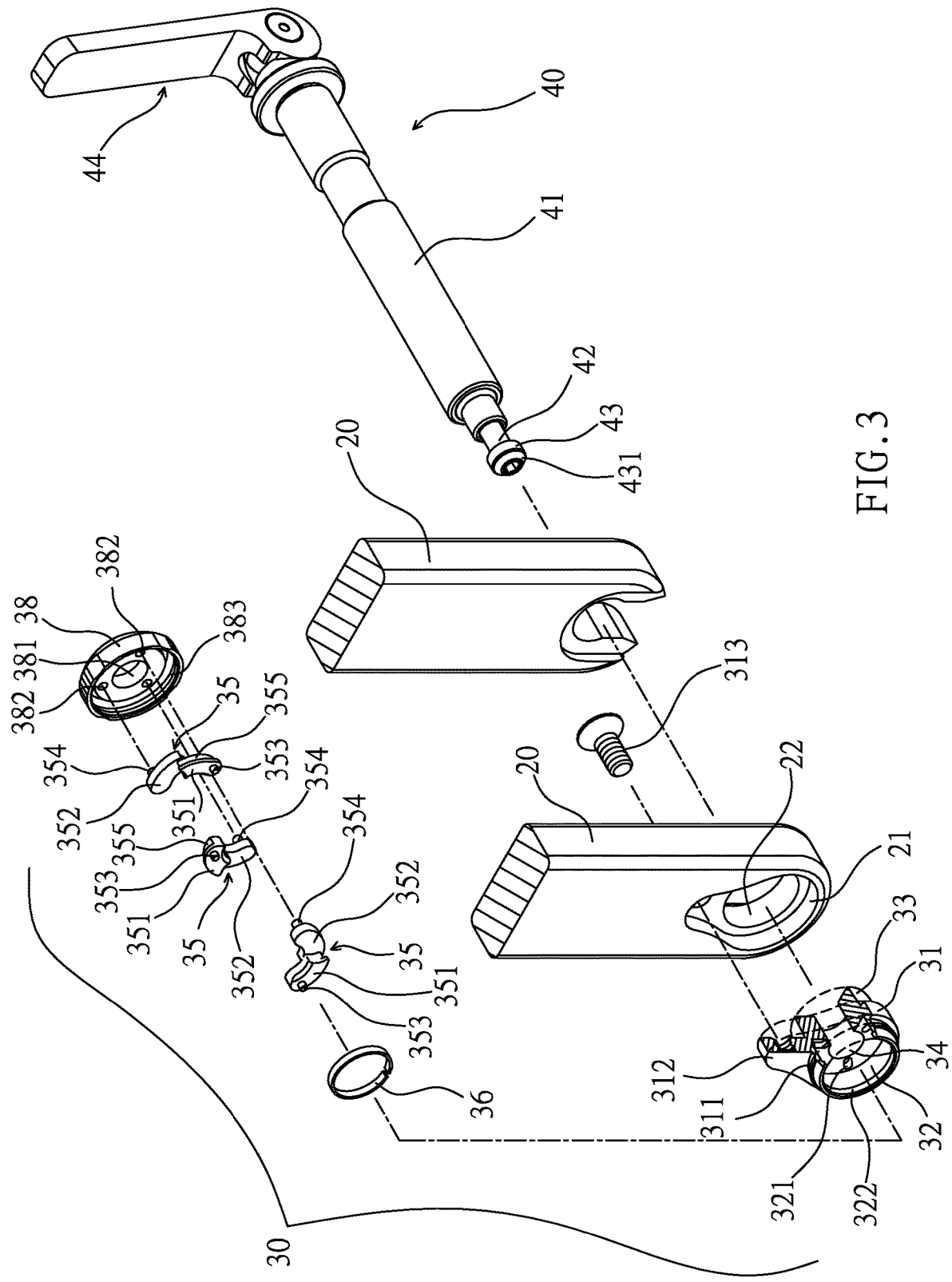
FIG. 3 is an exploded view of the quick-release unit of the present invention mounted to the fork.

Embodiments of the present invention will now be described, by way of example only, with reference to the accompanying drawings.

Referring to FIGS. 3 to 10, a quick-release structure comprises a fork 20 of a bicycle, a clamping unit 30, and a quick-release unit 40.

The outer side of one end of the fork 20 has a receiving space 21. A horizontal circular through hole 22 is defined in the receiving space 21.

The clamping unit 30 includes a base 31, a plurality of arc-shaped clamping members 35, an elastic ring 36, and a shaft cover 38. The base 31 is fixed in the receiving space 21. The outer side of the base 31 has a circular cavity 32. The inner side of the base 31 has an extension section 33 corresponding in position to the circular through hole 22. A circular perforation 34 is defined in the center of the circular cavity 32 and passes through the extension section 33. The extension section 33 is inserted in the circular through hole 22. The circular cavity 32 is provided with a plurality of elongated grooves 321 arranged radially at equal intervals around the circular perforation 34. The base 31 has an outer annular rib 311 on the outer periphery of the circular cavity 32. An inner annular rib 322 is provided on the inner periphery of the circular cavity 32. The arc-shaped clamping members 35 are arranged equidistantly in the circular cavity 32. The arc-shaped clamping members 35 each have a first arc-shaped clamping portion 351 and a second arc-shaped clamping portion 352. The first arc-shaped clamping portion 351 and the second arc-shaped clamping portion 352 are arranged in a staggered manner, not coplanar. The second arc-shaped clamping portion 352 of the front arc-shaped clamping member 35 overlaps the first arc-shaped clamping portion 351 of the rear arc arc-shaped clamping member 35. The first arc-shaped clamping portion 351 has a first axle 353 corresponding to the elongated groove 321. The first axle 353 is inserted in the elongated groove 321. The second arc-shaped clamping portion 352 has a second axle 354 extending in a direction opposite to the first axle 353. The outer wall of the first arc-shaped clamping portion 351 is concavely formed with a curved surface 355. The elastic ring 36 is buckled on the curved surfaces 355 of the outer walls of the first arc-shaped clamping portions 351 of the arc-shaped clamping members 35, so that the center of the arc-shaped clamping members 35 arranged in a ring is formed with an adjustable clamping opening 37 that can be elastically expanded and retracted. The adjustable clamping opening 37 is normally in a retracted state by the elastic force of the elastic ring 36. The shaft cover 38 has a central cover hole 381. The shaft cover 38 is formed with a plurality of axle grooves 382 around the cover hole 381. The axle grooves 382 correspond to the second axles 354 of the second arc-shaped clamping portions 352 of the arc-shaped clamping members 35, respectively. A cover rib 383 is provided on the inner periphery of the shaft cover 38. The second axles 354 of the second arc-shaped clamping portions 352 of the arc-shaped clamping members 35 are inserted into the axle grooves 382, respectively. The cover rib 383 is forced to pass through the outer annular rib 311, so that the shaft cover 38 is rotably pivoted to the base 31.

When the shaft cover 38 is rotated, the arc-shaped clamping members 35 are synchronously driven, and the arc-shaped clamping members 35 each have the second axle 354 as its axis for the first axle 353 to slide in the corresponding elongated groove 321. When the shaft cover 38 is rotated, the first axle 353 slides to the outer side of the elongated groove 321, so that the arc-shaped clamping members 35 can counteract the elastic force of the elastic ring 36 to expand the adjustable clamping opening 37.

The quick-release unit 40 has a shaft 41. One end of the shaft 41 is sequentially formed with a neck section 42 and an enlarged end 43. The diameter of the enlarged end 43 is greater than the diameter of the adjustable clamping opening 37 in the retracted state. The front end of the enlarged end 43 has a tapered portion 431. The other end of the shaft 41 is provided with a locking member 44. The shaft 41 of the quick-release unit 40 is inserted through two ends of the fork 20. The enlarged end 43 of the shaft 41 is inserted in the circular perforation 34 from the inner side of the fork 20 having the circular through hole 22, so that the tapered portion 431 counteracts the elastic force of the elastic ring 36, and the first axles 353 of the arc-shaped clamping members 35 slide along the respective elongated grooves 321, and the arc-shaped clamping members 35 each having the second axle 354 as its axis are expanded outwardly so that the adjustable clamping opening 37 is in an expanded state for the enlarged end 43 to pass through the adjustable clamping opening 37. After the enlarged end 43 passes through the adjustable clamping opening 37, the enlarged end 43 is inserted into the cover hole 381. The adjustable clamping opening 37 subjected to the elastic force of the elastic ring 36 is retracted to clamp the neck section 42, and then the shaft 41 is tightened by the locking member 44. With the above structure, the essential effect of rapid assembly is achieved.

Figures 4, 5:
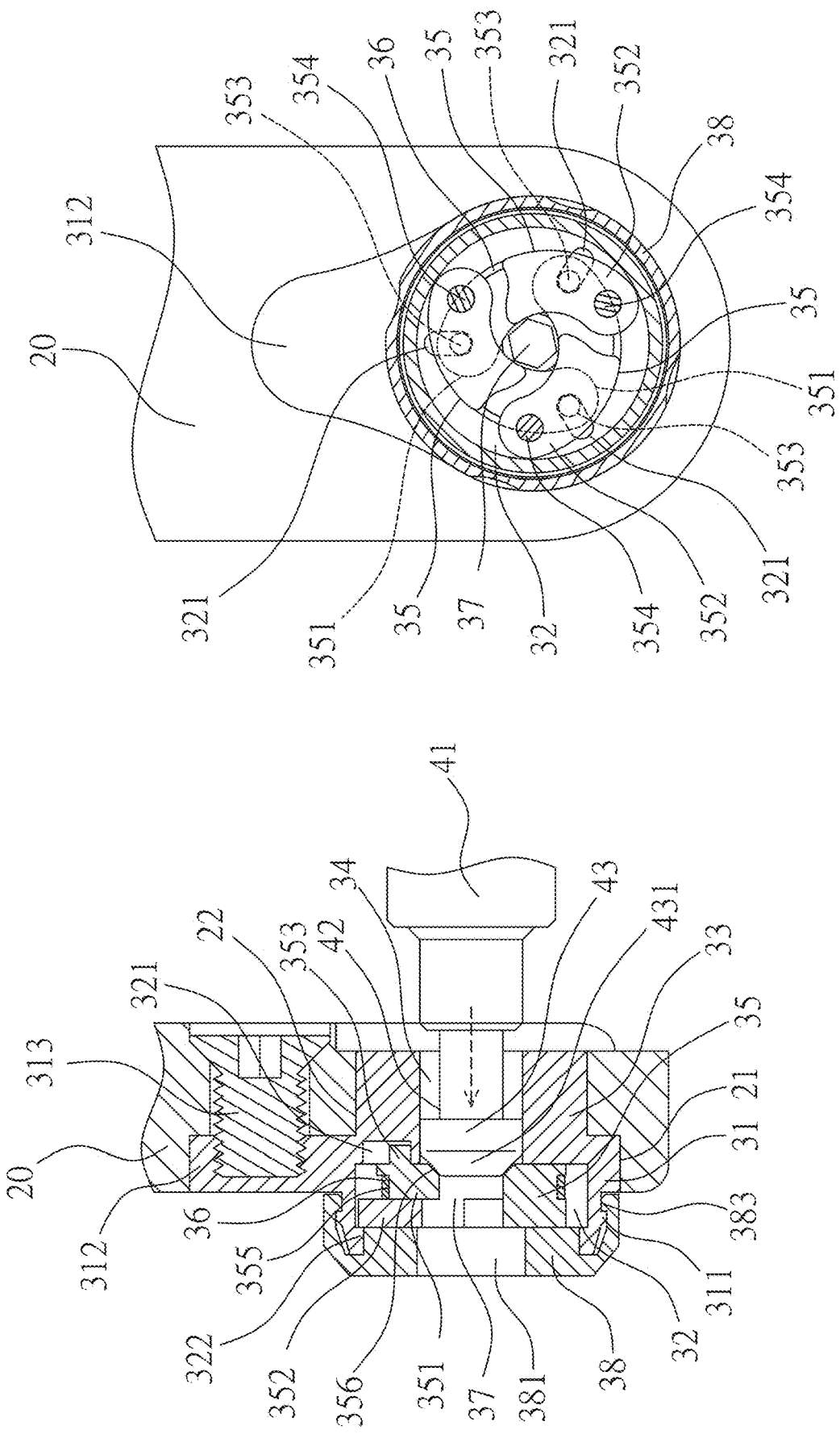
FIG. 4 is a cross-sectional view of the present invention, illustrating that the enlarged end is pushed into the adjustable clamping opening.
FIG. 5 is a planar view of the present invention, illustrating that the enlarged end is pushed into the adjustable clamping opening.
Figure 7:
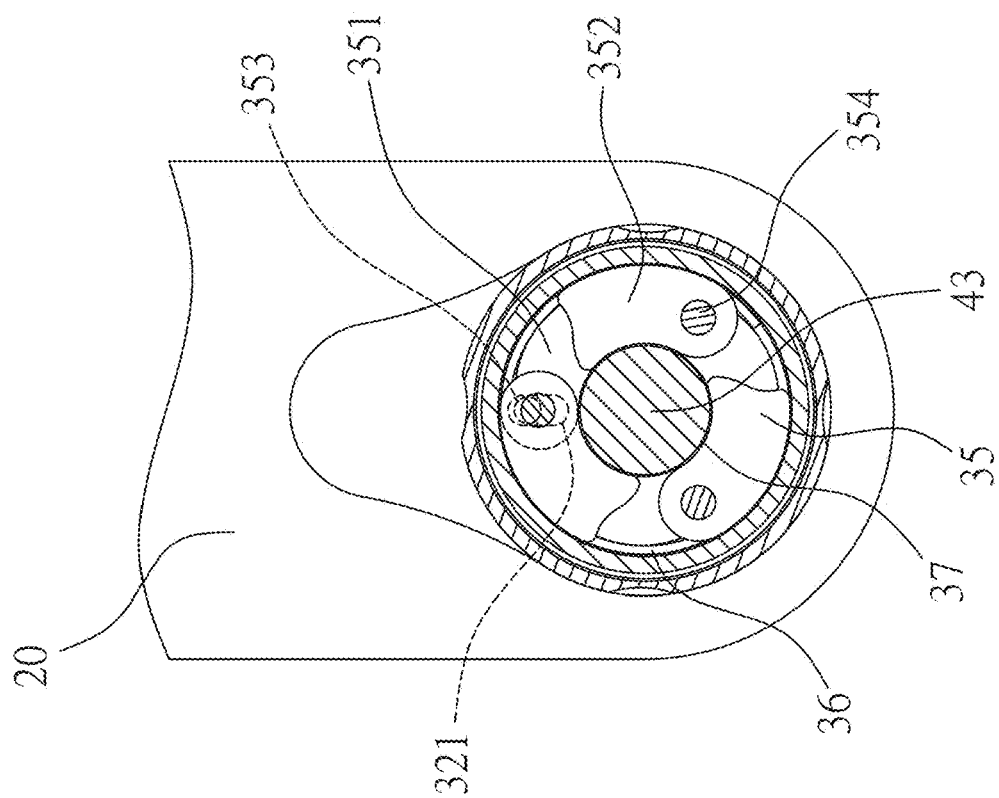
FIG. 7 is a planar view of the present invention, illustrating that the enlarged end passes through the adjustable clamping opening.
Figure 6:
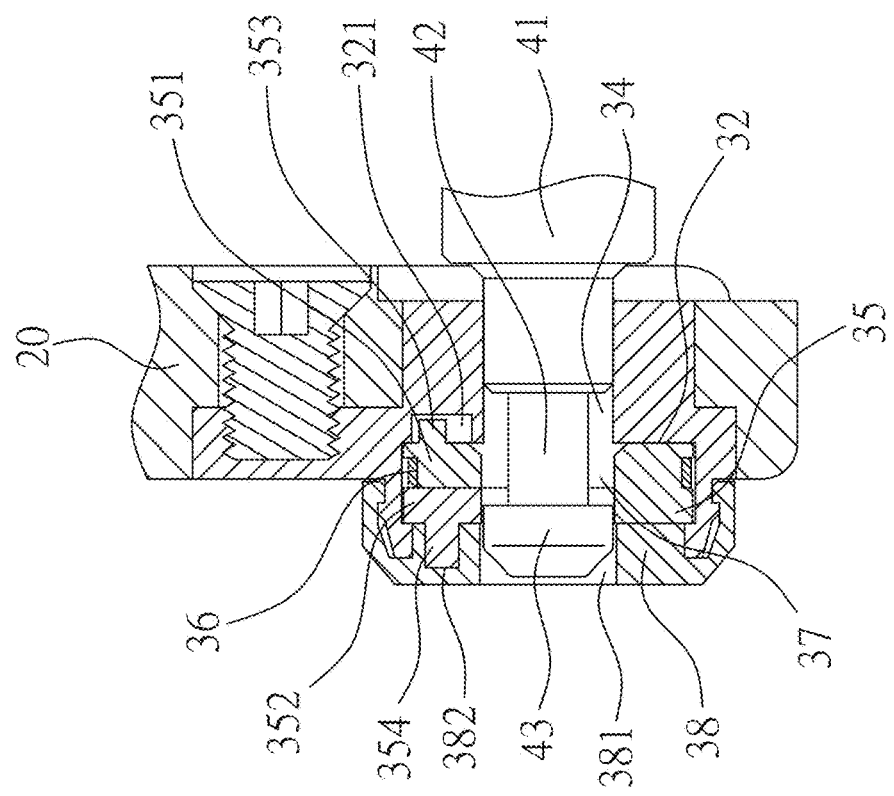
FIG. 6 is a cross-sectional view of the present invention, illustrating that the enlarged end passes through the adjustable clamping opening.
Figure 9:
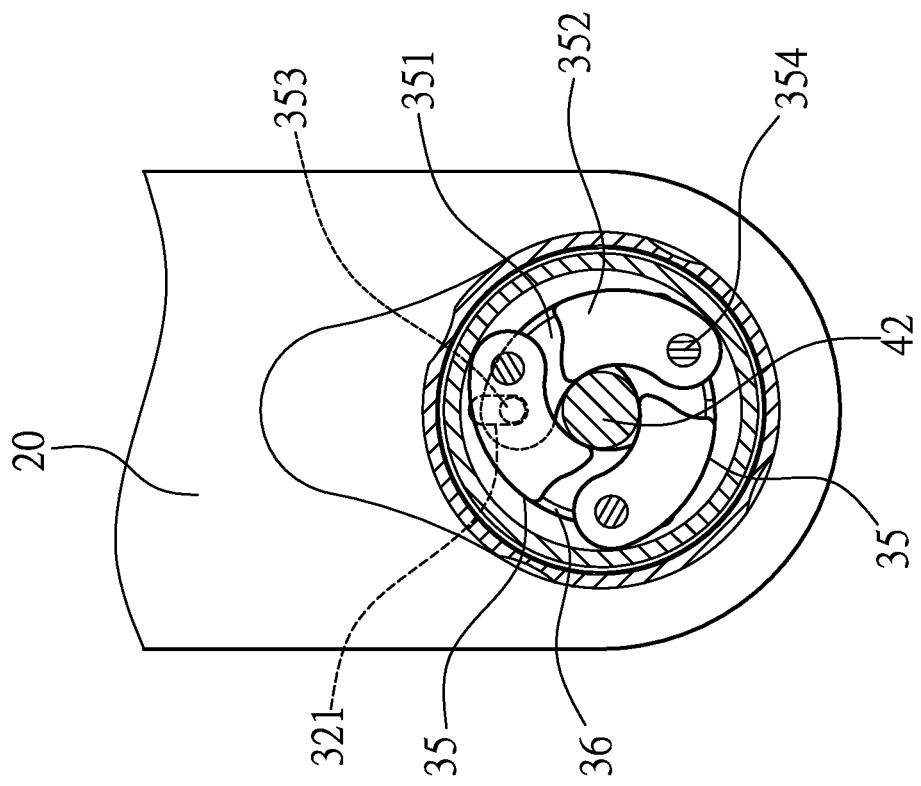
FIG. 9 is a planar view of the present invention, illustrating that the adjustable clamping opening is retracted to clamp the neck portion.
Figure 8:
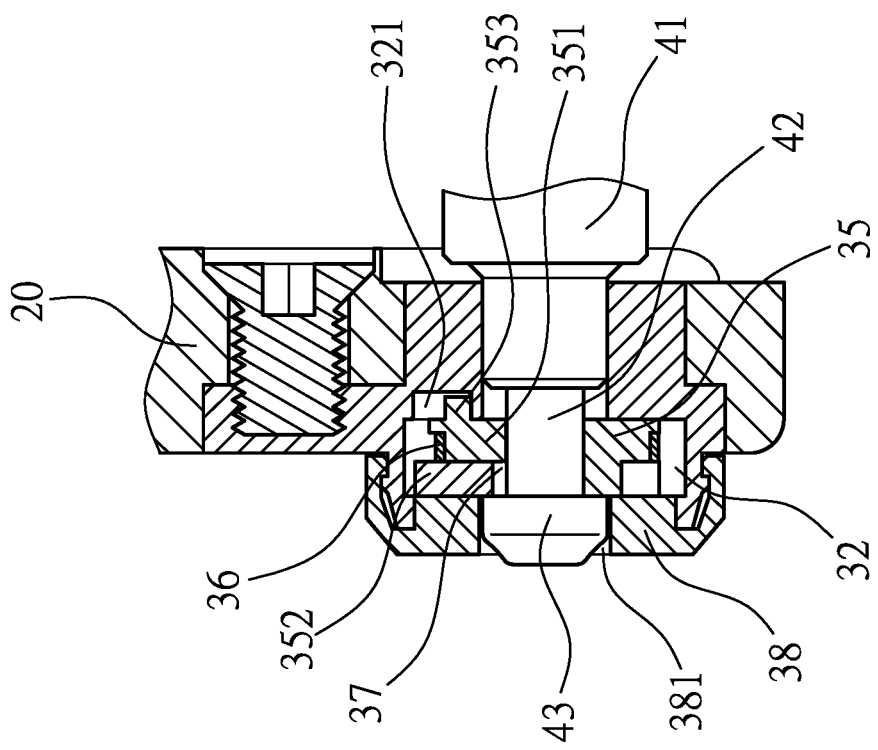
FIG. 8 is a cross-sectional view of the present invention, illustrating that the adjustable clamping opening is retracted to clamp the neck portion.

The assembly, function and efficacy of the present invention are described in detail below. Referring to FIGS. 3 to 10, the distance between the inner end of the elongated groove 321 of the present invention and the center of the circular perforation 34 is less than the distance between the outer end of the elongated groove 321 and the center of the circular perforation 34, that is, the elongated grooves 321 are arranged radially. When the arc-shaped clamping members 35 are to be assembled in the circular cavity 32, in order to dodge the inner annular rib 322, the arc-shaped clamping members 35 are placed obliquely and the first axles 353 are inserted into the elongated grooves 321, respectively. The elastic ring 36 is buckled on each curved surface 355, and the elastic force of the elastic ring 36 pushes each first axle 353 to the inner end of the elongated groove 321, so that the adjustable clamping opening 37 is normally in a retracted state. Through the curvature of the curved surface 355, when the elastic ring 36 is buckled, the inner annular rib 322 abuts against the outer edge of the second arc-shaped clamping portion 352 of each arc-shaped clamping member 35. This can prevent the arc-shaped clamping members 35 from disengaging from the circular cavity 32, achieving an auxiliary positioning effect. The first arc-shaped clamping portion 351 and the second arc-shaped clamping portion 352 of each arc-shaped clamping member 35 are arranged in a staggered manner, not coplanar. The arc-shaped clamping members 35 are overlapped, which can increase the number of the arc-shaped clamping members 35 arranged in a ring. The more the arc-shaped clamping members 35, the closer the adjustable clamping opening 37 is to a circular opening when it is retracted or expanded. The overlapping arrangement of the arc-shaped clamping members 35 has the effect of reducing the volume of the base 31 when compared with the same number of the arc-shaped clamping members 35. The tapered portion 431 of the shaft 41 may be formed into a concave cone shape. When the tapered portion 431 passes through the inner edges of the arc-shaped clamping members 35, the resistance of the enlarged end 43 is reduced to push the shaft 41 easily. The tapered portion 431 also assists in counteracting the elastic force of the elastic ring 36, thereby saving effort for the shaft 41 to be inserted easily. A chamfer 356 is formed on the inner edge of one side where the first axle 353 is located of the first arc-shaped clamping portion 351. When the tapered portion 431 passes through the first arc-shaped clamping portion 351, the frictional resistance between the chamfer 356 and the tapered portion 431 is reduced for the shaft 4 to be inserted easily. The shaft 41 of the quick-release unit 40 is inserted through the fork 20. When the tapered portion 431 of the enlarged end 43 is inserted in the adjustable clamping opening 37 (as shown in FIG. 4 and FIG. 5), the shaft 41 is pushed forward and the force is greater than the elastic force of the elastic ring 36. Each arc-shaped clamping member 35 is pivoted outwardly with the second axle 354 as its axis (as shown in FIG. 6 and FIG. 7), that is, the first axle 353 slides toward the outer end of the elongated groove 321, and the shaft cover 38 pivotally connected with the second axles 354 is rotated. In this way, the adjustable clamping opening 37 is expanded, allowing the enlarged end 43 of the shaft 41 to pass through the adjustable clamping opening 37. Until the neck section 42 of the shaft 41 is located at the adjustable clamping opening 37, the elastic ring 36 is no longer pressed by the external force and elastically recovers, so that the adjustable clamping opening 37 is in a retracted state again (as shown in FIG. 8 and FIG. 9). It can be understood that the first axle 353 slides toward the inner end of the elongated groove 321, so that the neck section 42 is clamped by the adjustable clamping opening. The diameter of the enlarged end 43 is greater than the diameter of the adjustable clamping opening 37 in a retracted state, so that the enlarged end 43 cannot retreat from the adjustable clamping opening 37. Finally, the locking member 44 is used to tighten the shaft 41 on the side of the fork 20. There is no need to waste time to assemble the shaft 41 in a screw-locking manner, which achieves the essential effects of quick assembly and easy force application.

Figure 10:
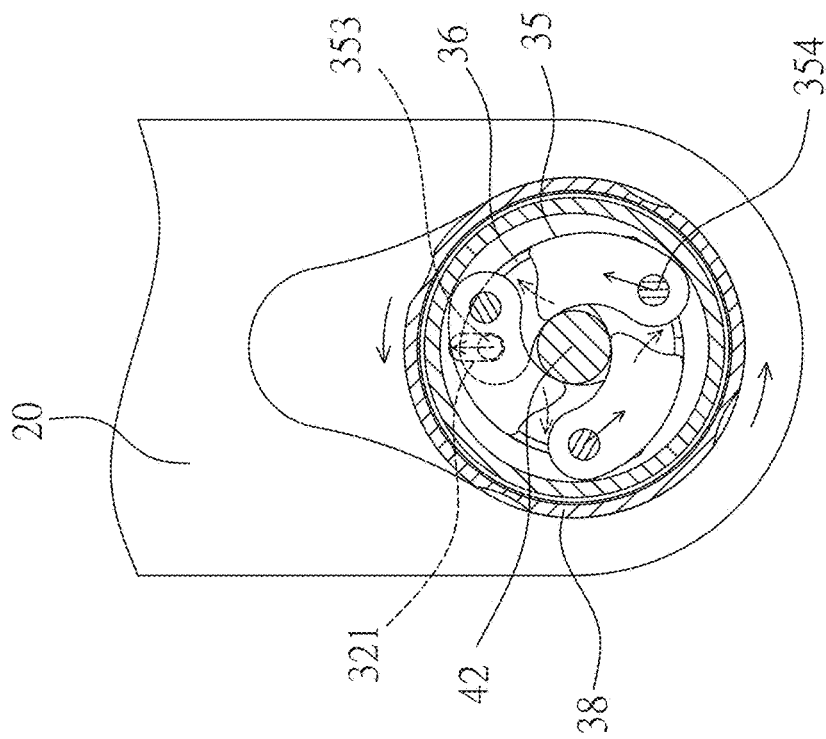
FIG. 10 is a cross-sectional view of the present invention, illustrating that the adjustable clamping opening is expanded by rotating the shaft cover.

When the quick-release unit 40 is to be disassembled and separated from the fork 20, the arc-shaped clamping members 35 are driven by rotating the shaft cover 38, and the force of rotation is greater than the elastic force of the elastic ring 36 to push each first axle 353 to slide toward the outer end of the elongated groove 321 (as shown in FIG. 10). The arc-shaped clamping members 35 each having the second axle 354 as its axis are pivoted outwardly so that the adjustable clamping opening 37 is expanded. In this way, the enlarged end 43 of the shaft 41 can be retracted to pass through the adjustable clamping opening 37 so that the shaft 41 can be pulled outwardly to disengage from the fork 20 quickly. It should be noted that when the shaft cover 38 is rotated to push the first axle 353 to move, the pushing direction of the first axle 353 cannot be perpendicular to the direction of the elongated groove 321, otherwise it is difficult to rotate the shaft cover 38. Furthermore, as to the means to fix the base 31, a lug 312 is provided on the periphery of the base 31. The lug 312 may be arranged in the receiving space 21. A screw 313 is locked to the lug 312 from the inner side of the fork 20 so that the base 31 is assembled and fixed in the receiving space 21.

Figure 12:
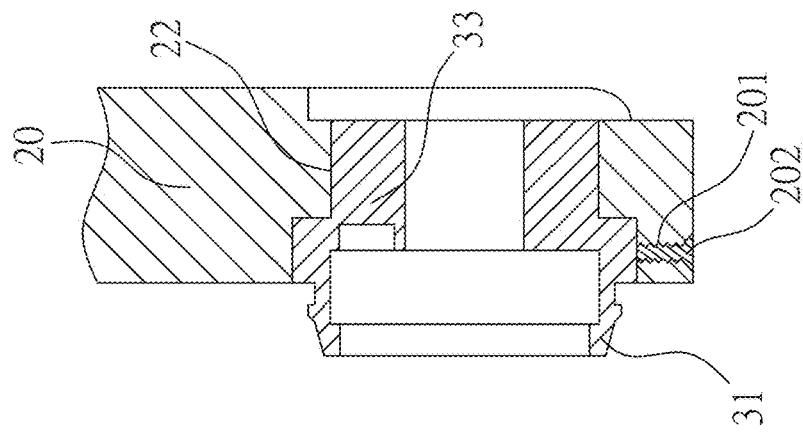
FIG. 12 is a cross-sectional view of another embodiment for fixing the base of the present invention.
Figure 11:
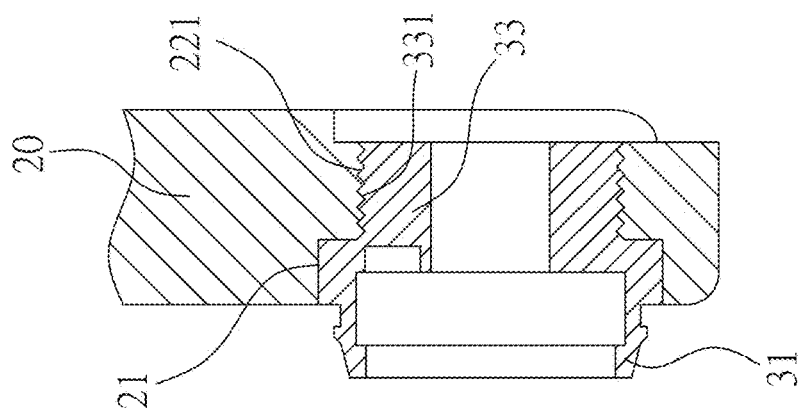
FIG. 11 is a cross-sectional view of an embodiment for fixing the base of the present invention.

FIG. 11 and FIG. 12 illustrate different means to fix the base 31. As shown in FIG. 11, the circular through hole 22 is provided with an internal thread 221, and the extension section 33 is provided with an external thread 331. The extension section 33 of the base 31 is screwed into the circular through hole 22, so that the base 31 is assembled and fixed in the receiving space 21. As shown in FIG. 12, the fork 20 is provided with a screw hole 201 corresponding to the outer wall of the base 31. A screw 202 is inserted through the screw hole 201 to tighten the outer wall of the base 31 so that the base 31 is firmly assembled in the receiving space 21 without rotating.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick-release structure, comprising a fork, a clamping unit, and a quick-release unit;

an outer side of one end of the fork having a receiving space, a horizontal circular through hole being defined in the receiving space;

the clamping unit including a base, a plurality of arc-shaped clamping members, an elastic ring, and a shaft cover; the base being fixed in the receiving space, an outer side of the base having a circular cavity, a circular perforation corresponding in position to the circular through hole being defined in a center of the circular cavity, the circular cavity being provided with a plurality of elongated grooves arranged radially at equal intervals around the circular perforation; the plurality of arc-shaped clamping members being arranged equidistantly in the circular cavity, the arc-shaped clamping members each having a first axle to slide in a corresponding one of the elongated grooves, the arc-shaped clamping members each having a second axle extending in a direction opposite to the first axle; the elastic ring being buckled on an outer periphery of each arc-shaped clamping member, a center of the arc-shaped clamping members arranged in a ring being formed with an adjustable clamping opening; an inner side of the shaft cover being formed with a plurality of axle grooves arranged annularly, the second axles of the arc-shaped clamping members being pivotally connected to the respective axle grooves, the shaft cover being rotably connected to the base; wherein when the shaft cover is rotated, the arc-shaped clamping members are synchronously driven, the arc-shaped clamping members each have the second axle as an axis for the first axle to slide toward an outer end of the corresponding elongated groove, and the arc-shaped clamping members counteract an elastic force of the elastic ring to expand the adjustable clamping opening;

the quick-release unit having a shaft, one end of the shaft being sequentially formed with a neck section and an enlarged end, the enlarged end having a diameter greater than that of the adjustable clamping opening in a retracted state, another end of the shaft being provided with a locking member;

wherein the shaft of the quick-release unit is inserted through two ends of the fork, the enlarged end of the shaft is inserted in the circular perforation from an inner side of the fork to counteract the elastic force of the elastic ring, so that the first axles of the arc-shaped clamping members slide toward the outer ends of the respective elongated grooves and the arc-shaped clamping members each having the second axle as the axis are expanded outwardly for the enlarged end to pass through the adjustable clamping opening; after the enlarged end passes through the adjustable clamping opening, the adjustable clamping opening subjected to the elastic force of the elastic ring is retracted to clamp the neck section, and the shaft is tightened by the locking member.

2. The quick-release structure as claimed in claim 1, wherein the arc-shaped clamping members each have a first arc-shaped clamping portion and a second arc-shaped clamping portion, the first arc-shaped clamping portion and the second arc-shaped clamping portion are arranged in a staggered manner, not coplanar, the second arc-shaped clamping portion of a front one of arc-shaped clamping members overlaps the first arc-shaped clamping portion of a rear one of the are arc-shaped clamping members; the first arc-shaped clamping portion has the first axle, and the second arc-shaped clamping portion has the second axle.

3. The quick-release structure as claimed in claim 2, wherein an outer wall of the first arc-shaped clamping portion is concavely formed with a curved surface, and the elastic ring is buckled on the curved surface.

4. The quick-release structure as claimed in claim 1, wherein an inner side of the base has an extension section, the circular perforation passes through the extension section, and the extension section is inserted in the circular through hole.

5. The quick-release structure as claimed in claim 4, wherein the circular through hole is provided with an internal thread, the extension section is provided with an external thread, and the extension section of the base is screwed into the circular through hole so that the base is assembled and fixed in the receiving space.

6. The quick-release structure as claimed in claim 1, wherein a lug is provided on a periphery of the base, the lug is located in the receiving space, and a screw is locked to the lug from the inner side of the fork so that the base is assembled and fixed in the receiving space.

7. The quick-release structure as claimed in claim 1, wherein the fork is provided with a screw hole corresponding to an outer wall of the base, and a screw is inserted through the screw hole to tighten the outer wall of the base so that the base is assembled and fixed in the receiving space.

8. The quick-release structure as claimed in claim 1, wherein a front end of the enlarged end has a tapered portion.

9. The quick-release structure as claimed in claim 1, wherein the base has an outer annular rib on an outer periphery of the circular cavity, a cover rib is provided on an inner periphery of the shaft cover, and the cover rib is forced to pass through the outer annular rib so that the shaft cover is rotably pivoted to the base.

10. The quick-release structure as claimed in claim 1, wherein a chamfer is formed on an inner edge of one side where the first axle is located of the first arc-shaped clamping portion.

\* \* \* \* \*